(Model.) 3 Sheets—Sheet 1.
J. DAVIS.
APPARATUS FOR ILLUSTRATING THE FORM OF THE SOLAR SYSTEM.
No. 394,959. Patented Dec. 25, 1888.
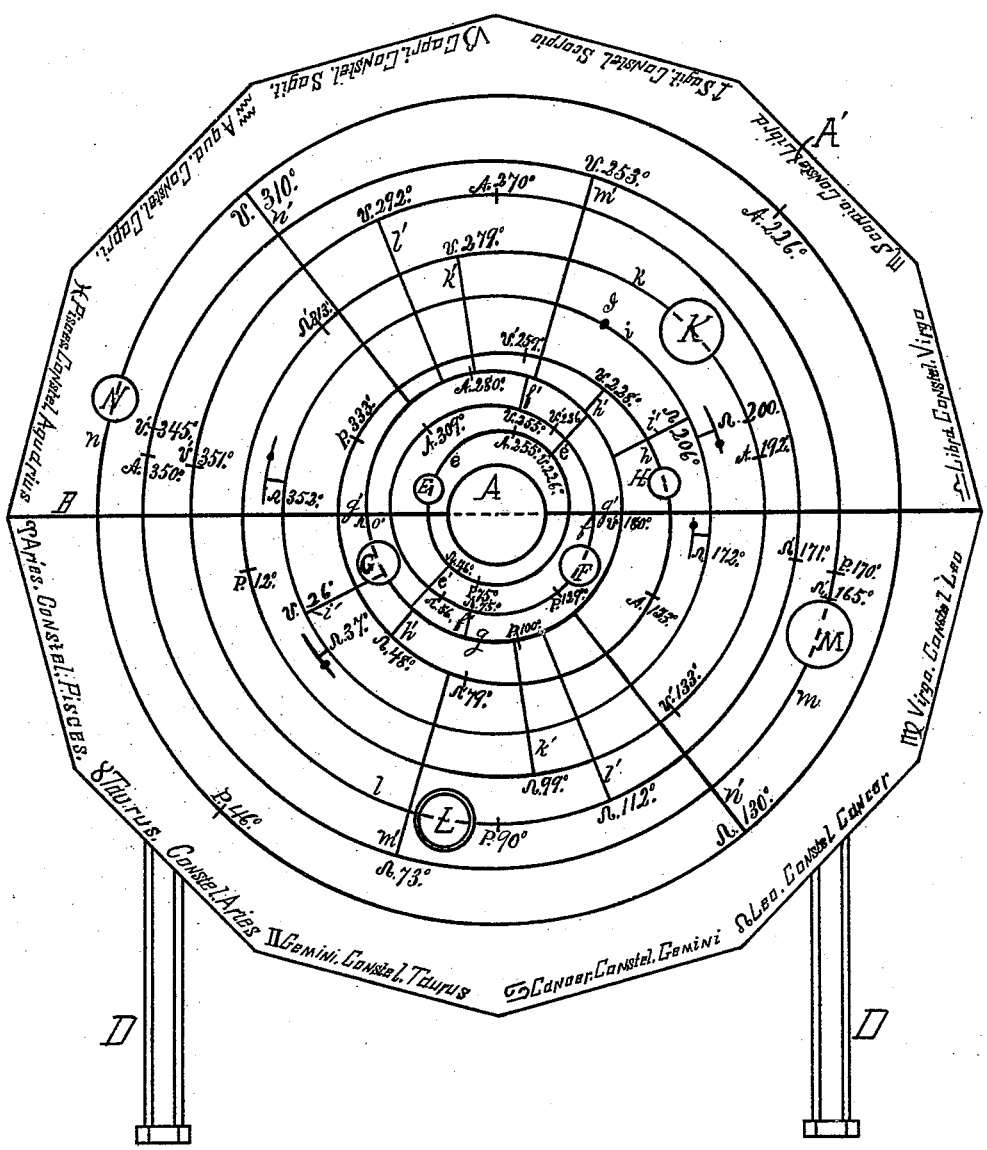
Witnesses.
Chas. R. Wright
W. Read
Inventor:
John Davis.
per Enos Simpson
N. PETERS, Photo-Lithographer, Washington, D. C.

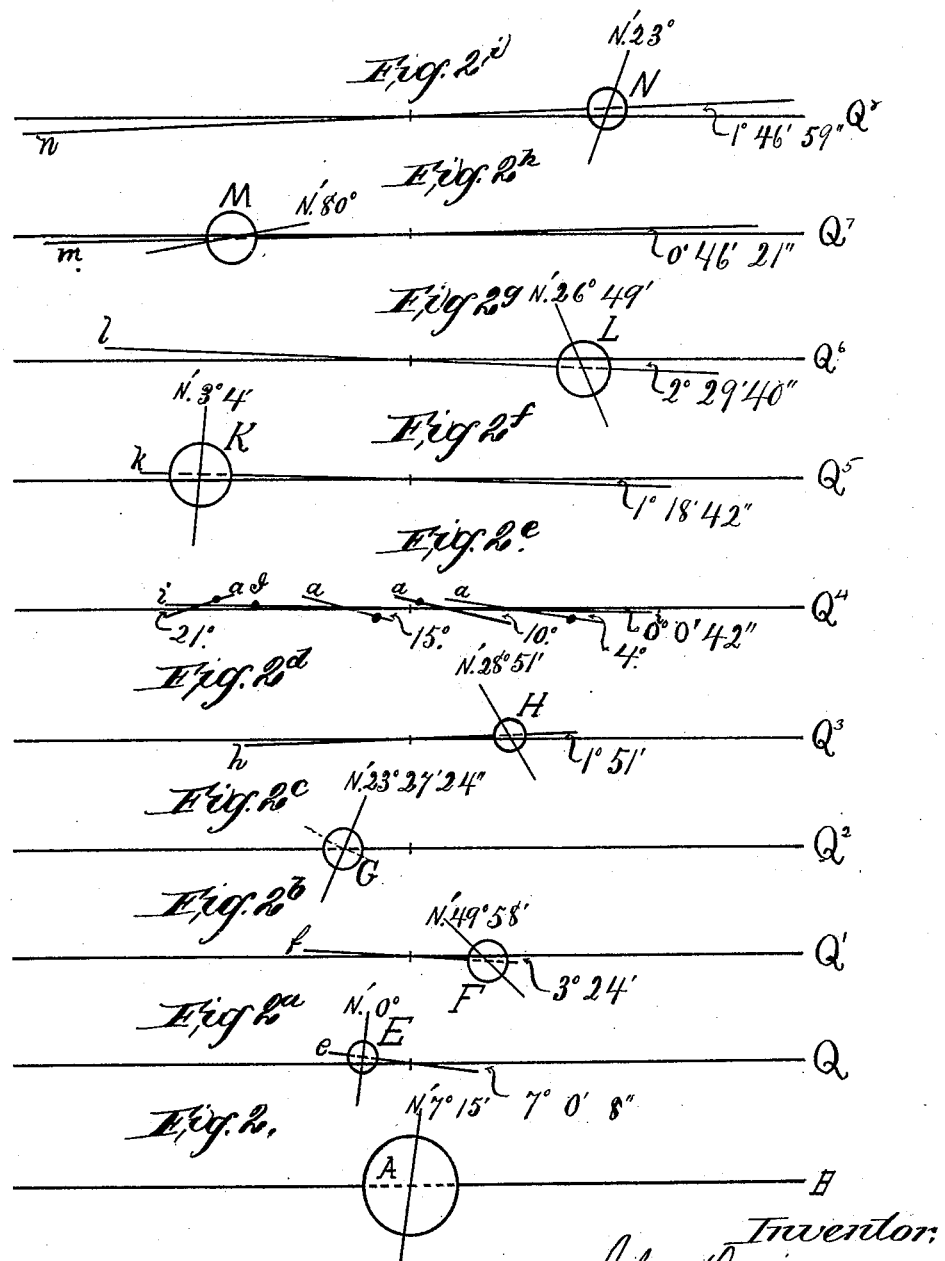

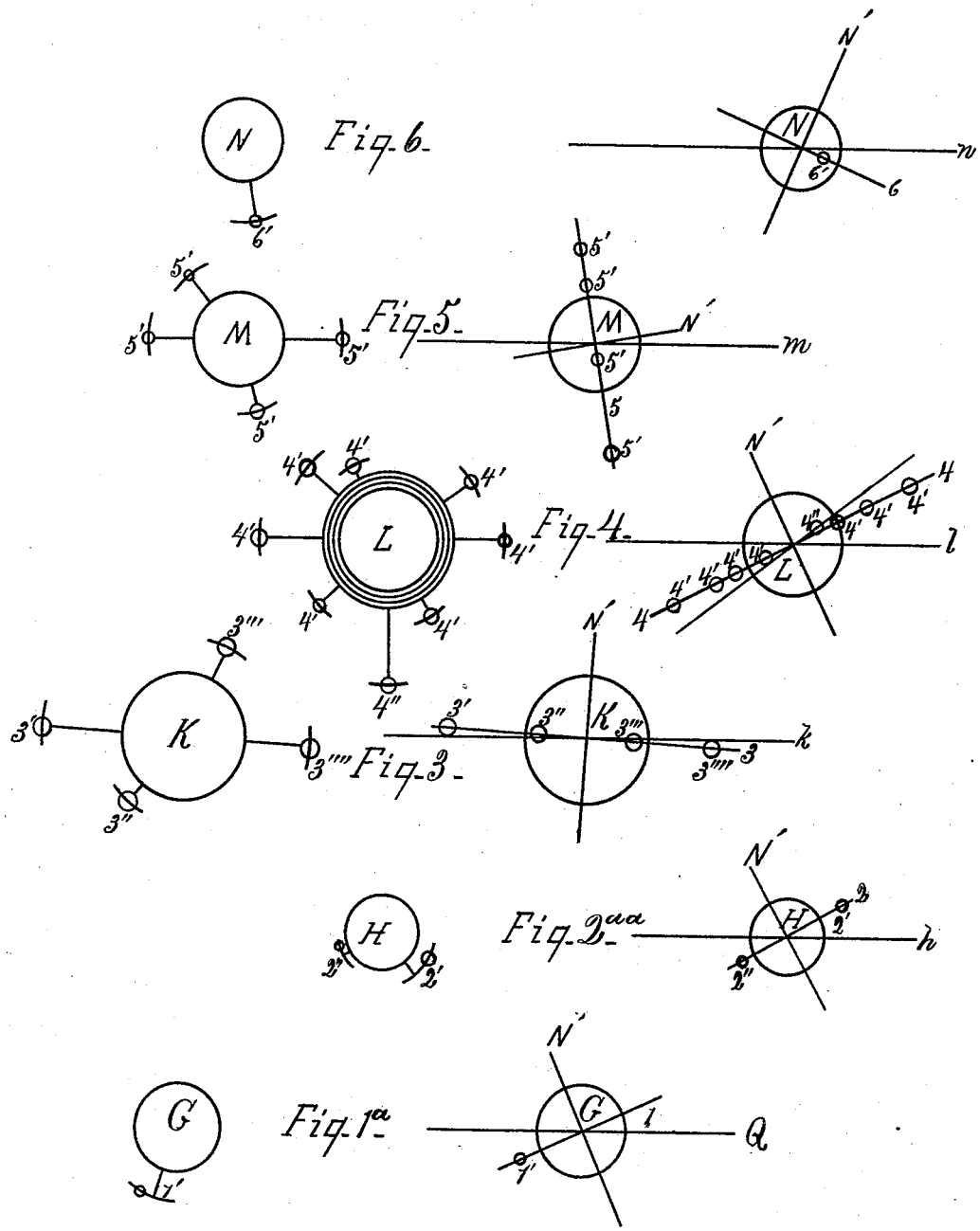

UNITED STATES PATENT OFFICE.

JOHN DAVIS, OF ALLEGHENY, PENNSYLVANIA.

APPARATUS FOR ILLUSTRATING THE FORM OF THE SOLAR SYSTEM.

SPECIFICATION forming part of Letters Patent No. 394,959, dated December 25, 1888.

Application filed September 10, 1883. Serial No. 106,095. (Model.)

*To all whom it may concern:*

Be it known that I, JOHN DAVIS, a citizen of the United States, residing at Allegheny, in the county of Allegheny and State of Pennsylvania, have invented certain new and useful Improvements in Apparatus for Illustrating the Form and Science of the Solar System in Connection with the Zodiac; and I do hereby declare the following to be a full, clear, and exact description of the invention, such as will enable others skilled in the art to which it appertains to make and use the same.

My invention relates to an improvement in apparatus for illustrating the form and science of the solar system in connection with the zodiac; and it consists in a peculiar construction and arrangement of parts, all of which will be hereinafter fully described.

In the accompanying drawings, which form a part of this specification, Figure 1 is a face or side view of my improvement in apparatus for illustrating the form of the solar system, together with the form of the zodiac and the science connected therewith. Fig. 2 represents an equatorial view of the sun. Fig. $2^a$ represents an equatorial view of the planet Mercury and the angle of its orbit to the plane of the ecliptic. Fig. $2^b$ represents an equatorial view of the planet Venus and the angle of its orbit to the plane of the ecliptic. Fig. $2^c$ represents an equatorial view of the earth and the inclination of her equator to the plane of the ecliptic. Fig. $2^d$ represents an equatorial view of the planet Mars and the angle of its orbit to the plane of the ecliptic. Fig. $2^e$ represents several of the asteroids and the inclination of their orbits to the plane of the ecliptic. Fig. $2^f$ represents an equatorial view of the planet Jupiter and the angle of its orbit to the plane of the ecliptic. Fig. $2^g$ represents an equatorial view of the planet Saturn and the angle of its orbit to the plane of the ecliptic. Fig. $2^h$ represents an equarial view of the planet Uranus and the angle of its orbit to the plane of the ecliptic, and Fig. $2^i$ represents a similar view of the planet Neptune. Figs. $1^a$, $2^{aa}$, 3, 4, 5, and 6 represent detail views hereinafter more fully described.

A represents the sun on the rod B, which is attached by one end to the zodiac at the first point of the sign Aries and by the other end to the zodiac at the first point of the sign Libra, which zodiac is represented by a wide band, A', to which are attached legs D, and on which rests the entire apparatus.

E represents Mercury, and *e* his elliptical orbit with the perihelion and aphelion marked on it; and *e'* represents the supports of his orbit, which connect it at its nodes with the orbit *g* of the earth. (No equinoctial or solstitial points are marked on this orbit, as the axis of the planet Mercury is by some of the best authorities supposed to be perpendicular to the plane of his orbit.)

F represents Venus, and *f* her elliptical orbit, with the perihelion and aphelion points and the ascending and descending nodes of her equator on her orbit (which are her equinoctial points) marked; and *f'* represents the supports of her orbit, which connect it at its nodes with the orbit *g* of the earth.

G represents the earth, and *g* her elliptical orbit, with the aphelion and perihelion points marked; and *g'* represents the ascending and descending nodes of her equator on her orbit, which are her equinoctial points, as well as the points of attachment of her orbit to the rod B, which lies wholly in the plane of her orbit.

H represents Mars, and *h* his elliptical orbit with the perihelion, aphelion, solstitial points, and ascending and descending nodes of his equator on his orbit (which are his equinoctial points) marked; and *h'* represents the supports of his orbit, which connect it at its nodes with the orbit *g* of the earth.

I represents one of the asteroids, and *i* its elliptical orbit, as the representative of a class of bodies known as "asteroids" and their orbits, which will be more fully described hereinafter; and *i'* represents the supports of its orbit, which are attached at its nodes to the orbit *g* of the earth.

K represents Jupiter, and *k* his elliptical orbit, with the perihelion and aphelion points and ascending and descending nodes of his equator on his orbit (which are his equinoctial points) marked; and *k'* represents the supports of his orbit, which connect it at its nodes with the orbit *g* of the earth.

L represents Saturn and his rings, and *l* his elliptical orbit, with the periphelion and aphelion points and the ascending nodes of his equator on his orbit (which are his equinoctial points) marked; and $l'$ represents the supports of his orbit, which connect it at its nodes with the orbit $g$ of the earth.

M represents Uranus, and $m$ his elliptical orbit, with the perihelion and aphelion points, and the ascending and descending nodes of his equator on his orbit (which are his conjectured equinoctial points) marked; and $m'$ represents the supports of his orbit, which connect it at its nodes with the orbit $g$ of the earth.

N represents Neptune, and $n$ his elliptical orbit, with the perihelion and aphelion points, the ascending and descending nodes of his equator on his orbit (which are his conjectured equinoctial points) marked; and $n'$ represents the supports of his orbit which connect it at its nodes with the orbit $g$ of the earth.

A' represents an edge view of the zodiac (corresponding with that of the apparatus hereinbefore described) divided into twelve parts, each part representing a sign or thirty degrees in longitude, and also the constellation with which it is (now) associated.

In Fig. 2, letter A represents the sun with the rod B, which lies wholly in the plane of the earth's orbit passing through its center and the axis of the sun at its computed inclination to the plane of the ecliptic. Q represents the plane of the ecliptic, and $e$ the orbit of Mercury, forming its nodes with said plane; and E represents Mercury with his axis in its conjectured position, perpendicular to the plane of his orbit, making the plane of his orbit coincide with the plane of his equator. Q' represents the plane of the ecliptic, and $f$ the orbit of Venus, forming its nodes with said plane; and F represents Venus with her axis at its computed inclination to the plane of its orbit. $Q^2$ represents the plane of the ecliptic, and G represents the earth in her orbit, which lies wholly in this plane, with her axis at its computed inclination to the plane of said orbit. $Q^3$ represents the plane of the ecliptic, and $h$ the orbit of Mars, forming his nodes with said plane; and H represents Mars with his axis at its computed inclination to the plane of his orbit. $Q^4$ represents the plane of the ecliptic, and $i$ represents the orbit of one of the asteroids, I, at about an average distance from the sun in relation to all the other known asteroids, and so near said plane that it may be regarded for all practical purposes as being coincident with it; and $a\ a\ a\ a$ are sections of the orbits of other asteroids, some on the inside and some on the outside of the orbit $i$, showing one of the nodes of each. These sections are so arranged as to show how the sections of the orbits of all known asteroids may be arranged and attached in the plane of the ecliptic, so as to indicate the inclination of the orbit of each to the plane of the ecliptic, and to indicate those that are at less than an average distance from the sun, and also those that are at more than an average distance from him in relation to all the known asteroids. $Q^5$ represents the plane of the ecliptic, and $k$ represents the orbit of Jupiter, forming its nodes with said plane; and K represents Jupiter with his axis at its computed inclination to the plane of his orbit. $Q^6$ represents the plane of the ecliptic, and $l$ the orbit of Saturn, forming its nodes with said plane; and L represents Saturn with his axis at its computed inclination to the plane of his orbit. $Q^7$ represents the plane of the ecliptic, and $m$ the orbit of Uranus, forming its nodes with said plane; and M represents Uranus with his axis at its conjectured inclination to the plane of his orbit. $Q^8$ represents the plane of the ecliptic, and $n$ the orbit of Neptune, forming its nodes with said plane; and N represents Neptune with his axis at its conjectured inclination to the plane of his orbit.

In Fig. 1$^a$, G represents the earth in two views, and $l$ represents the plane of her equator, and $l'$ represents the moon attached to a section of its orbit, which is arranged at its computed approximate inclination to said plane and attached at or near its node formed by it and said section to the equator of its primary.

In Fig. 2$^{aa}$, H represents Mars in two views, and 2 represents the plane of his equator, and 2' 2'' his moons attached to sections of their orbits, which are arranged at their computed approximate inclinations to said plane and attached at or near their nodes formed by it and said sections to the equator of their primary. It will be understood that the angles formed by the planes of the orbits of the satellites in general with the planes of the equators of their primaries have no fixed value.

In Fig. 3, K represents Jupiter in two views, and 3 represents the plane of his equator, and 3' 3'' 3''' 3'''' represent his moons attached to sections of their orbits, which are arranged at their computed approximate inclinations to said plane and attached at or near their nodes formed by it and said sections to the equator of their primary. The angles formed by these sections of the orbits of the moons of Jupiter with the plane of their primary's equator are variable and so very small, especially in an ordinary-sized apparatus like the one we are describing, that they may for all practical purposes be regarded as being coincident with said plane of the primary, as is represented in the drawings.

In Fig. 4, L represents Saturn and his rings in two views, and 4 represents the plane of his equator, and 4' represents his moons attached to sections of their orbits arranged at their computed approximate inclinations to said plane and attached at or near their nodes formed by it and said sections to the rings of Saturn which are coincident with the plane of the equator of their primary. The angles formed by the sections of the orbits of seven of the inner moons of Saturn with the plane of their primary's equator are variable and so very small, especially in an ordinary-sized apparatus like the one we are describing, that they may for all practical purposes be regarded as being coincident with the plane of his equator, as is represented in the drawings. The section of the orbit of the outermost moon, 4″, of Saturn is arranged at an angle of about ten degrees with the plane of his rings, and is attached thereto, which are coincident with the plane of his equator.

In Fig. 5, M represents Uranus in two views, and 5 represents the conjectured plane of his equator, and 5′ represents his moons attached to sections of their orbits, which are arranged at their conjectured inclinations to said plane and attached at or near their nodes, formed by it and said sections to the equator of their primary.

In Fig. 6, N represents Neptune in two views, and 6 represents the plane of his conjectured equator, and 6′ represents his moon attached to a section of its orbit, which is arranged at its conjectured inclination to said plane and attached at or near one of its nodes formed by it and said section to the equator of its primary.

The inclinations of the axes of Uranus and Neptune are not definitely known, and since the inclinations of the planes of the orbits of their moons to the plane of the ecliptic have been computed, and since it has been discovered that the moons of these two planets have retrograde motions around their primaries, reasoning from what has been discovered in relation to the motions of Jupiter and Saturn on their axes, that they revolve in the same direction and that all of their moons revolve in the direction in which their primaries turn on their axes, and that all except one moon of Saturn revolve in or very nearly in the planes of their primaries' equators; hence we may infer that Uranus and Neptune have retrograde axial motions to correspond to the direction of the motions of their moons around them, and that their moons revolve in or very nearly in the planes of their equators, respectively, as is represented in the drawings.

Since the angles formed by the sections of the orbits of the moons of Uranus and Neptune with the planes of their primaries' equators, respectively, being variable and so very small, especially in an ordinary-sized apparatus like the one we are describing, they may for all practical purposes be regarded as being coincident with the planes of their equators, respectively, as is represented in the drawings.

From the foregoing description it will be understood that as the orbit of the asteroid I is at an angle of only forty-two seconds with the plane of the ecliptic for all practical purposes, it may be regarded as coincident with said plane of the ecliptic. Accordingly the attachments representing the nodes and connecting the rings representing the orbits of Jupiter, Saturn, Uranus, and Neptune may be made to said ring representing the orbit of said asteroid, instead of to the ring representing the earth's orbit, as hereinbefore shown and described; or said attachments may be made to the ring representing the orbit of one of the other bodies lying in substantially the same plane as the ecliptic. It will furthermore be seen that the moons of the primary planets being placed on sections of rings representing their orbits, which sections are at their computed inclinations to the planes of their primaries' equators, respectively, are also at their computed inclinations to the planes of their primaries' ecliptics, respectively.

Having thus described my invention, what I claim is—

1. In an apparatus for illustrating the solar system, the combination, with an object representing the sun, of a series of metallic rings, one of which bears a body representing the earth, the others of which bear bodies representing the planets, the plane of the ring carrying the earth being the plane of the ecliptic and the planes of the rings carrying the planets having such relative positions to said ring carrying the earth as to show the relation of the orbital planes of the planets to the plane of the ecliptic, and means for supporting said rings in place, substantially as described.

2. In an apparatus for illustrating the solar system, the combination, with an object representing the sun, of a series of elliptical metal rings representing the orbital paths of the planets, the ellipticity of said rings being proportioned to the known ellipticity of the orbits of the planets and having the perihelion and aphelion points marked thereon, and means for supporting said wires and sun, substantially as described.

3. An apparatus for illustrating the solar system, together with the zodiac and the science connected therewith, which consists of a band representing the zodiac having a series of rings arranged within it and a transverse rod carrying an object representing the sun and one of said rings representing the earth's orbit, to which ring are attached the other rings of said series for representing the orbits of the other primary planets and asteroids, which means of attachment of said rings to the ring representing the earth's orbit shall represent the nodes of said planets, substantially as herein described.

4. An apparatus for illustrating the form of the solar system, together with the zodiac and the science connected therewith, consisting of a band representing the zodiac having a series of rings arranged within it and a transverse rod carrying an object representing the sun and one of said rings representing the earth's orbit, to which ring are attached the other rings of said series for representing the orbits of the other primary planets and asteroids, which means of attachment of said rings to the ring representing the earth's orbit shall represent the nodes of said planets, and said planets represented by objects placed upon said rings and arranged thereon, so that the computed inclinations of their axes to the planes of their orbits shall be represented, substantially as herein described.

5. An apparatus for illustrating the form of the solar system, together with the zodiac and the science connected therewith, which consists of a band representing the zodiac having a series of rings arranged within it and a transverse rod carrying an object representing the sun, and one of said rings representing the earth's orbit, to which ring are attached the other rings of said series for representing the orbits of the other primary planets and asteroids, which means of attachment of said rings to the ring representing the earth's orbit shall represent the nodes of said planets, together with the moons of the primary planets at the computed inclinations of the planes of their orbits to the planes of their primaries' equators, respectively, substantially as herein described.

6. An apparatus for illustrating the form of the solar system, together with the zodiac and the science connected therewith, consisting of a band representing the zodiac having a series of rings, with the perihelion, aphelion, and equinoctial points marked thereon, respectively, arranged within it, and a transverse rod carrying an object representing the sun and one of said rings representing the earth's orbit, to which ring are attached the other rings of said series for representing the orbits of the other primary planets and asteroids, which means of attachment of said rings to the ring representing the earth's orbit shall represent the nodes of said planets, substantially as herein described.

In testimony whereof I have affixed my signature in presence of two witnesses.

JOHN DAVIS.

Witnesses:
FRANK M. GREEN,
LENOX SIMPSON.